United States Patent
Wintergerst et al.

(10) Patent No.: US 9,117,019 B2
(45) Date of Patent: Aug. 25, 2015

(54) DEBUGGING REMOTE SOFTWARE APPLICATIONS ACROSS WAN CONNECTIONS

(71) Applicants: Michael Wintergerst, Muehlhausen (DE); Ralf Schmelter, Wiesloch (DE); Johannes Scheerer, Heidelberg (DE); Thomas Klink, Mörlenbach (DE); Steffen Schreiber, Frankenthal (DE); Dietrich Mostowoj, Ludwigshafen (DE); Matthias Braun, Illingen (DE)

(72) Inventors: Michael Wintergerst, Muehlhausen (DE); Ralf Schmelter, Wiesloch (DE); Johannes Scheerer, Heidelberg (DE); Thomas Klink, Mörlenbach (DE); Steffen Schreiber, Frankenthal (DE); Dietrich Mostowoj, Ludwigshafen (DE); Matthias Braun, Illingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/951,774

(22) Filed: Jul. 26, 2013

(65) Prior Publication Data
US 2015/0033205 A1   Jan. 29, 2015

(51) Int. Cl.
G06F 11/36 (2006.01)

(52) U.S. Cl.
CPC .......... *G06F 11/362* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 6,263,456 B1 | 7/2001 | Boxall et al. | |
| 6,618,854 B1 | 9/2003 | Mann | |
| 6,637,024 B1 | 10/2003 | Johnson et al. | |
| 6,826,746 B2 | 11/2004 | Evans et al. | |
| 7,107,578 B1 | 9/2006 | Alpern | |
| 7,216,257 B2 | 5/2007 | Kilian | |
| 7,546,584 B2 * | 6/2009 | Rovang | 717/124 |
| 7,644,312 B2 | 1/2010 | Hind et al. | |
| 7,669,186 B2 | 2/2010 | Nolan et al. | |
| 7,849,445 B2 | 12/2010 | Tran | |
| 8,180,845 B2 | 5/2012 | Brendle et al. | |
| 8,307,247 B2 | 11/2012 | Shillington et al. | |
| 8,312,438 B2 | 11/2012 | Luedde | |
| 2004/0123271 A1 | 6/2004 | Bindewald et al. | |
| 2006/0129991 A1 * | 6/2006 | Kilian et al. | 717/124 |
| 2006/0174225 A1 | 8/2006 | Bennett et al. | |

(Continued)

FOREIGN PATENT DOCUMENTS

EP        1408410 A1 *    4/2004

OTHER PUBLICATIONS

Lu, Charles. "Debug Java applications remotely with Eclipse." IBM.com. N.p., Dec. 9, 2008. Web. Sep. 17, 2014. <http://www.ibm.com/developerworks/library/os-eclipse-javadebug/>.*

(Continued)

*Primary Examiner* — Wei Zhen
*Assistant Examiner* — Binh Luu
(74) *Attorney, Agent, or Firm* — Fish & Richardson P.C.

(57) ABSTRACT

The present disclosure describes methods, systems, and computer program products for providing remote debugging of a software or cloud application across a wide area network. A method includes transmitting, from a remote communication device to a client or cloud computing device, instructions to adjust a running application to a debugging mode; receiving, at the remote communication device from a server, aggregated thread data in a data packet by using a second debugging data protocol different from the Java Debug Wire Protocol; receiving a debugging command and applying the debugging command to the application running in the debugging mode.

25 Claims, 8 Drawing Sheets

(56) References Cited

U.S. PATENT DOCUMENTS

| | | |
|---|---|---|
| 2007/0055958 A1* | 3/2007 | Birenheide et al. ........... 717/124 |
| 2008/0301648 A1 | 12/2008 | Heidasch |
| 2010/0153239 A1 | 6/2010 | Liebich et al. |
| 2010/0192121 A1 | 7/2010 | Unnithan et al. |
| 2010/0281458 A1 | 11/2010 | Paladino et al. |
| 2011/0061042 A1 | 3/2011 | Deshmukh et al. |
| 2011/0138359 A1 | 6/2011 | Deshmukh et al. |
| 2011/0138363 A1 | 6/2011 | Schmelter et al. |
| 2011/0138365 A1 | 6/2011 | Schmelter et al. |
| 2011/0138366 A1 | 6/2011 | Wintergerst et al. |
| 2011/0138385 A1 | 6/2011 | Schmelter et al. |
| 2012/0102488 A1 | 4/2012 | Wintergerst et al. |
| 2012/0131555 A1 | 5/2012 | Hossain et al. |
| 2012/0151452 A1 | 6/2012 | Zinkovsky et al. |
| 2012/0192154 A1* | 7/2012 | Alpern ......................... 717/124 |
| 2013/0042222 A1 | 2/2013 | Maddela |

OTHER PUBLICATIONS

IBM. "Simplify use of Java Platform Debugger Architecture to debug remote Java programs." IP.com. N.p., Jun. 9, 2003. Web. Sep. 17, 2014. <http://ip.com/IPCOM/000012903>.*

IBM. "Method and apparatus for multi-party collaborative debugging of Java applications." IP.com. N.p., Jul. 7, 2009. Web. Sep. 17, 2014. <http://ip.com/IPCOM/000184995>.*

Java™ Debug Wire Protocol; 6 pages; http://docs.oracle.com/javase/1.5.0/docs/guide/jpda/jdwp-spec.html; last visited Jul. 31, 2013.

* cited by examiner

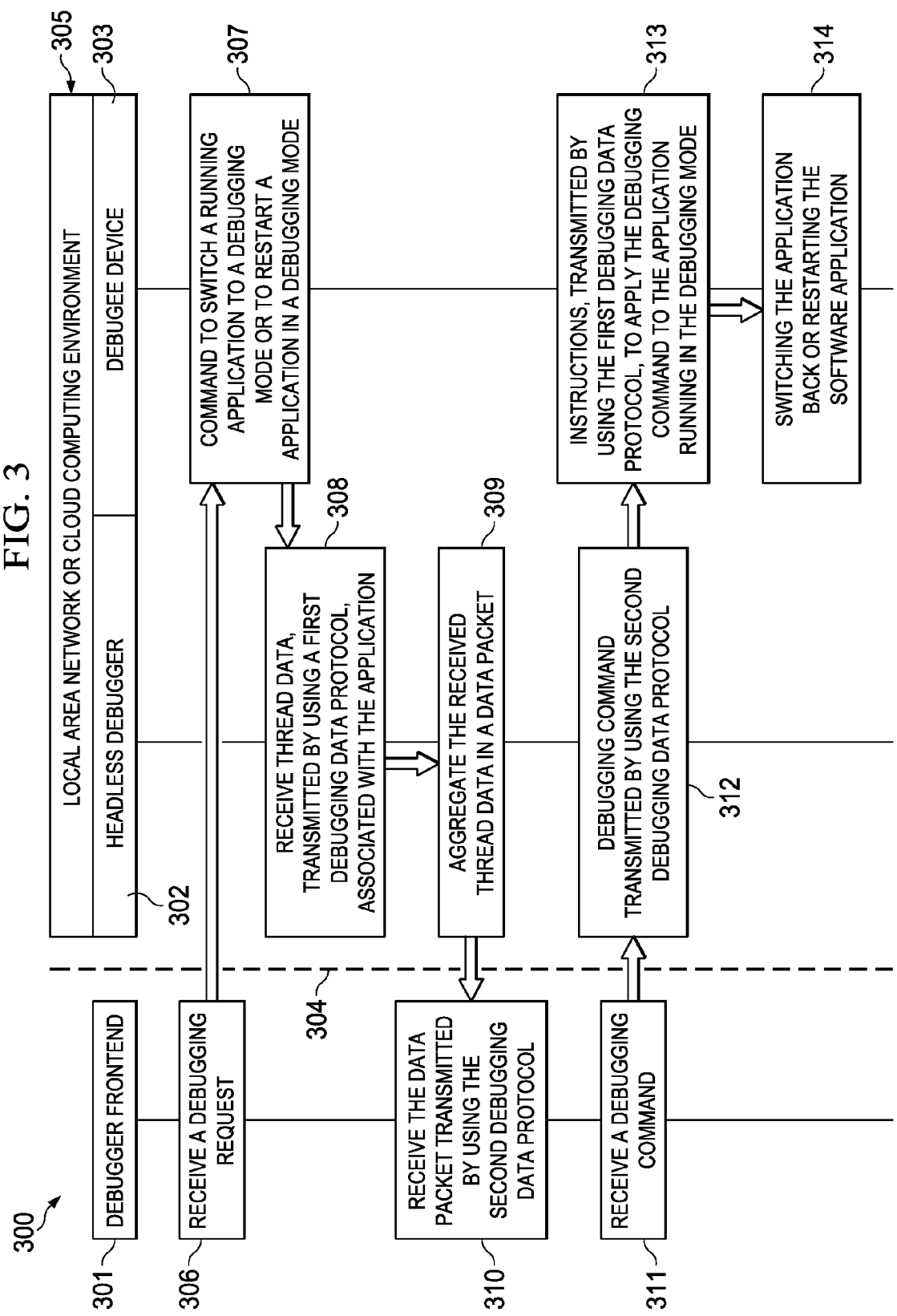

DEBUGGING REMOTE SOFTWARE APPLICATIONS ACROSS WAN CONNECTIONS

TECHNICAL FIELD

The present disclosure relates to software, computer systems, and computer-implemented methods for providing remote debugging across a wide area network to a software application which is running on a client device or in a cloud computing environment.

BACKGROUND

Even modern design methodologies and state of the art implementation tools, e.g. integrated development environments (IDE), static analysis tools and compilers, usually cannot assure the functional correctness of applications except for very small fragments. State of the art applications have considerable size which makes static program analysis of the complete system impossible. This means that the inevitable defects in the applications have to be found dynamically, e.g., when the application is executed. A popular state of the art method for finding and eliminating defects in applications is debugging.

Debugging is usually done locally, e.g., the debugger and the debugged application (debuggee) run on the same system or in a network with very low latency. The debuggee is usually the Java Virtual Machine (VM) which needs to get debugged—the debugger is the process being responsible for providing debugging information to an application programmer and controlling the whole debugging run. In Java, there is a standardized debugging data protocol spoken between the debugger and the debuggee. This is the so-called Java Debug Wire Protocol (JDWP).

SUMMARY

The present disclosure describes computer-implemented methods, systems, and computer program products for providing remote debugging across a wide area network to a software application (e.g., a Java application) which is running on a client device or in a cloud computing environment.

One or more of the following aspects of this disclosure can be embodied alone or in combination as methods that include the corresponding operations. One or more of the following aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following aspects of this disclosure can be implemented alone or in combination on a computer program product encoded on a non-transitory, tangible storage medium, the product comprising computer readable instructions for causing one or more computers to perform the operations according to the one or more of the following aspects.

A general aspect 1a includes the following operations: receiving, at a local computing device, instructions from a remote communication device to adjust a running software application to a debugging mode (e.g., to switch a running software application to a debugging mode or to restart a software application in a debugging mode), wherein the remote communication device is communicatively connected to a local server via a wide area network connection; receiving, at the local server from the local computing device, thread data associated with the software application, wherein the thread data was transmitted by using a first debugging data protocol; aggregating, at the local server, the received thread data and transmitting the aggregated thread data in a data packet to the remote communication device by using a second debugging data protocol (e.g., a binary two-way communication protocol); receiving, at the local server, a debugging command from the remote communication device, wherein the debugging command was transmitted by using the second debugging data protocol; transmitting, from the local server to the local computing device by using the first debugging data protocol, instructions to apply the debugging command to the software application running in the debugging mode; and wherein the first debugging data protocol is different from the second debugging data protocol.

A general aspect 1b includes the following operations: transmitting, from a remote communication device to a local computing device, instructions device to adjust a running software application to a debugging mode (e.g., to switch a running software application to a debugging mode or to restart a software application in a debugging mode), wherein the remote communication device is communicatively connected to a local server via a wide area network connection; receiving, at the remote communication device from the local server, aggregated thread data in a data packet by using a second debugging data protocol, wherein the thread data is associated with the software application on the local computing device, and wherein the thread data was aggregated at the local server after the thread data was transmitted from the local computing device to the local server by using a first debugging data protocol; receiving, at the remote communication device, a debugging command and transmitting the debugging command to the local server by using the second debugging data protocol; instructing the local server to transmit to the local computing device, by using the first debugging data protocol, instructions to apply the debugging command to the software application running in the debugging mode; and wherein the first debugging data protocol is different from the second debugging data protocol.

A general aspect 2a includes the following operations: receiving, at a debugging server communicatively connected to a cloud application (e.g., a Java application), a debugging request from a remote communication device, wherein the debugging server and the cloud application are implemented in a cloud computing environment, wherein the remote communication device is communicatively connected to the debugging server via a wide area network connection, and wherein the debugging request includes data identifying the cloud application to be debugged; adjusting, by the debugging server and based on the data identifying the cloud application to be debugged, the running cloud application to be debugged to a debugging mode (e.g., switch the running application to the debugging mode or restarting the cloud application to be debugged in a debugging mode); receiving, at the debugging server from the cloud application to be debugged, thread data associated with the cloud application to be debugged, wherein the thread data was transmitted by using a first debugging data protocol; aggregating, at the debugging server, the received thread data and transmitting the aggregated thread data in a data packet to the remote communication device by using a second debugging data protocol; receiving, at the debugging server, a debugging command from the remote communication device, wherein the debugging command was transmitted by using the second debugging data protocol; transmitting, from the debugging server to the cloud application by using the first debugging data protocol, instructions to apply the debugging command to the cloud application running in the debugging mode; and wherein the first debugging data protocol is different from the second debugging data protocol.

A general aspect 2b includes the following operations: transmitting, from a remote communication device to a debugging server implemented in a cloud computing environment, a debugging request, wherein the remote communication device is communicatively connected to the debugging server via a wide area network connection, and wherein the debugging request includes data identifying a cloud application (e.g., a Java application) to be debugged; receiving, at the remote communication device from the debugging server, aggregated thread data in a data packet by using a second debugging data protocol, wherein the thread data is associated with the cloud application to be debugged that is implemented in the cloud computing environment, and wherein the thread data was aggregated at the debugging server after the thread data was transmitted from the cloud application to be debugged to the debugging server by using a first debugging data protocol; receiving, at the remote communication device, a debugging command and transmitting the debugging command to the debugging server by using the second debugging data protocol; instructing the debugging server to transmit to the cloud application running in a debugging mode in the cloud computing environment, by using the first debugging data protocol, instructions to apply the debugging command to the cloud application to be debugged; and wherein the first debugging data protocol is different from the second debugging data protocol.

Aspect 3 according to any one of aspects 1 to 2, wherein the debugging command includes at least one of changing the programming code of the software or cloud application; suspending of a thread associated with the thread data, resuming a thread associated with the thread data, setting a breakpoint, retrieving a list of threads associated with the thread data, identifying a thread category of a thread associated with the thread data, retrieving thread stack traces, obtaining variable content of certain stack frames, obtaining structural information about symbols, and getting expression evaluation results.

Aspect 4 according to any one of aspects 1 a, 1b, or 3, the operations further including: upon the adjusting of a running software application to a debugging mode, initiating a local area network communication session between the local server and the local computing device or the software application running in the debugging mode.

Aspect 5 according to any one of aspects 1 a to 4, identifying, at the local or debugging server, related thread data within the received thread data by their relationship and aggregating the identified related thread data before the transmitting of the data packet, wherein the data packet includes the aggregated related thread data, optionally wherein the relationship between the related thread data is at least one of common programming code of the software application, same thread of the software application, and including identical breakpoint in programming code.

Aspect 6 according to any one of aspects 1a to 5, wherein the thread data includes at least one of a list of identified threads of the software or cloud application, breakpoints in the programming code of the software or cloud application, error messages, type of undesired behavior of a user interface, categories associated with identified threads, thread stack traces, and variable content associated with stack frames.

Aspect 7 according to any one of aspects 1 to 6, wherein the debugging command includes instructions to switch the software or cloud application from the debugging mode to a running mode in which the software or cloud application is configured to process user input, or wherein the debugging command includes instructions to restart the software application in a running mode in which the software application is configured to process user input.

Aspect 8 according to any one of aspects 1a, 1b or 3 to 7, wherein the local server is implemented within the local computing device or wherein the local server is connected to the local computing device via a local area network connection.

Aspect 9 according to any one of aspects 1 to 8, wherein the wide area network connection has a latency time of more than 50 ms or of more than 100 ms.

Aspect 10 according to any one of aspects 1 a to 9, wherein the local computing device or the cloud computing environment is a Java virtual machine and wherein the first debugging data protocol is the Java Debug Wire Protocol.

Aspect 11 according to any one of aspects 1a to 10, wherein the remote communication device is a display terminal configured to display a graphical user interface and to receive user interactions with the displayed graphical user interface, wherein the display terminal includes a communication interface configured to receive and transmit data by using the second debugging data protocol, and wherein the remote communication device is configured to transform the user interactions to the debugging command, optionally: wherein the local or debugging server provides the graphical user interface to the remote communication device for display, and wherein the local or debugging server is configured to change the displayed graphical user interface based on the user interactions.

The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates an example process flow for providing remote debugging across a wide area network to a software or cloud application which is running on a client device or in a cloud computing environment.

Reference numbers and designations in the various drawings indicate exemplary aspects, implementations or embodiments of particular features of the present disclosure.

DETAILED DESCRIPTION

This disclosure generally relates to software, computer systems, and computer-implemented methods for providing remote debugging across a wide area network to a software application which is running on a client device or in a cloud computing environment. Specifically, a remote debugging of software applications is provided across wide area networks having high latency (e.g., a latency of higher than 50 ms or 100 ms). Implementations of the present disclosure described herein may provide one or more of the following features:

First, a remote debugging of a cloud application is provided in one round trip between the debuggee and the debugger.

Second, the described approach may allow debugging of Java VMs from arbitrary vendors without any change on the debuggee side.

Third, the debugger across the wide area network from the debuggee is reduced to a lightweight debugger frontend and the network data traffic between the debuggee and the debugger frontend is reduced to one or just a few (less than 10) data packets for executing one user interaction/request.

Fourth, a dynamic (e.g., real time or almost real-time) remote debugging tool for running cloud applications is provided to a developer at the debugger frontend, thereby enhancing efficiency, speed and/or accuracy of the remote debugging process.

Fifth, the described approach allows to debug or check cloud applications in their actual target execution environment, instead of a local version that usually differs significantly from the target execution environment, thereby increasing productivity for the development of the cloud applications.

Sixth, the described approach is scalable to multiple debuggers or multiple cloud applications (e.g., multiple debuggees) and the amount of thread data packets (per application to be debugged) that is transmitted between the debuggee and the debugger across a wide area network connection is (substantially or almost) independent from the number of threads per application to be debugged.

Figure 1:
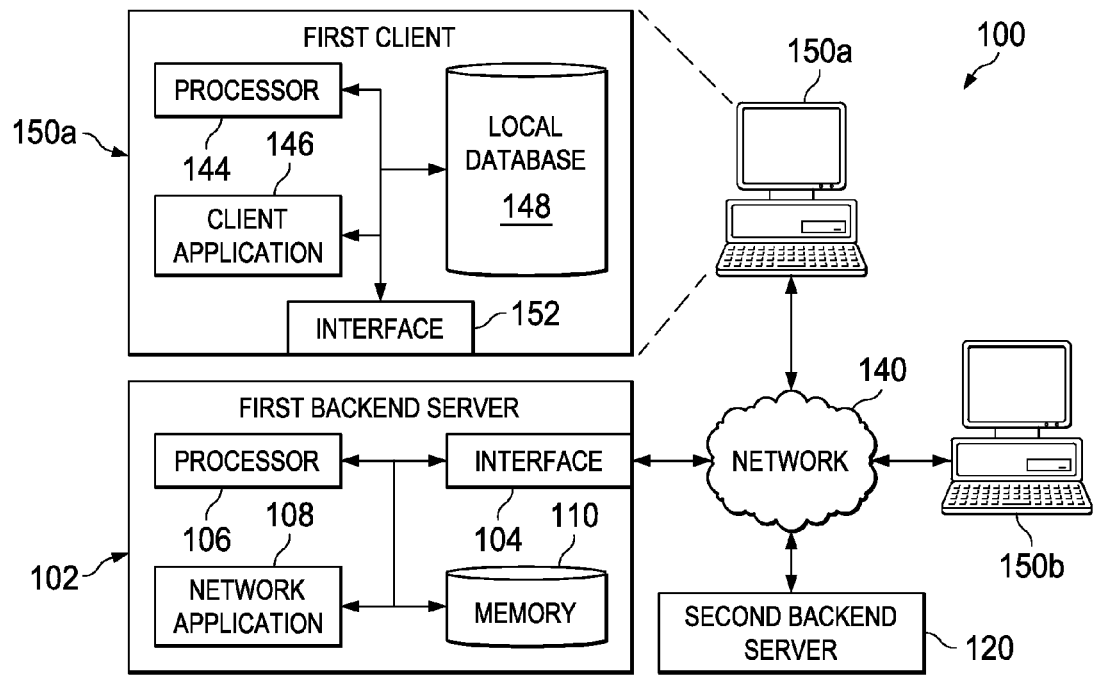
FIG. 1 illustrates an example of a network environment.

FIG. 1 illustrates an example environment 100 for implementing various features of a system for providing remote debugging across a wide area network to a software application which is running on a client device or in a cloud computing environment. The illustrated environment 100 includes, or is communicably coupled with, a (e.g., front-end) client 150a-b, which represents a customer installation (e.g., an on-demand or an on-premise installation) or a user in a cloud-computing environment, and backend server systems 102, 120. In some instances, the front-end client 150a-b may co-reside on a single server or system, as appropriate. At least some of the communications between the client 150a-b and the backend servers 102, 120 may be performed across or via network 140 (e.g., via a wide area network (WAN) such as the Internet). In an aspect, environment 100 depicts an example configuration of a system for establishing business networks using networked applications built on a shared platform in a cloud computing environment, such as environment 100. The client 150a-b and/or the server 102, 120 include development technology and hosted and managed services and applications built on top of the underlying platform technology. In an implementation of the present disclosure described herein, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" comprises an SAP ByDesign platform, Success Factors Platform, SAP NetWeaver Application Server Java, ERP Suite technology or in-memory database such as High Performance Analytic Appliance (HANA) platform.

The illustrated environment 100 of FIG. 1 includes one or more (e.g., front-end) clients 150a-b. The client 150a-b may be associated with a particular network application or development context, as well as a particular platform-based application system. The client 150a-b may be any computing device operable to connect to or communicate with at least one of the servers 102, 120 using a wireline or wireless connection via the network 140, or another suitable communication means or channel. In some instances, the client 150a—may be a part of or associated with a business process involving one or more network applications, or alternatively, a remote developer associated with the platform or a related platform-based application.

In general, the client 150a-b includes a processor 144, an interface 152, a client application 146 or application interface, a graphical user interface (GUI), and a memory or local database 148. In general, the client 150a-b includes electronic computer devices operable to receive, transmit, process, and store any appropriate data associated with the environment 100 of FIG. 1. As used in this disclosure, the client 150a-b is intended to encompass a personal computer, laptop, tablet PC, workstation, network computer, kiosk, wireless data port, smart phone, personal data assistant (PDA), one or more processors within these or other devices, or any other suitable processing device. The client or tenant 150a-b may be a mobile communication device. For example, the client 150a-b may comprise a computer that includes an input device, such as a keypad, touch screen, mouse, or other device that can accept user information, and an output device that conveys information associated with the operation of one or more client applications, on-demand platforms, and/or the client 150a-b itself, including digital data, visual information, or GUI.

Both the input and output device may include fixed or removable storage media such as a magnetic storage media, CD-ROM, or other suitable media, to both receive input from and provide output to users of client 150a-b through the display, namely, the GUI. The client application 146 or application interface can enable the client 150a-b to access and interact with applications and modules in backend server systems using a common or similar platform. The client application 146 allows the client 150a-b to request and view content on the client 150a-b. In some implementations, the client application 150a-b can be and/or include a web browser. In some implementations, the client application 146 can use parameters, metadata, and other information received at launch to access a particular set of data from the server 102, 120. Once a particular client application 146 is launched, the client can process a task, event, or other information which may be associated with the server 102, 120. Further, although illustrated as a single client application 146, the client application 146 may be implemented as multiple client applications in the client 150a-b.

There may be any number of clients 150a-b associated with, or external to, environment 100. For example, while illustrated environment 100 includes one client 150a-b, alternative implementations of environment 100 may include multiple clients communicably coupled to the one or more of the systems illustrated. In some instances, one or more clients 150a-b may be associated with administrators of the environment, and may be capable of accessing and interacting with the settings and operations of one or more network applications, and/or other components of the illustrated environment 100. Additionally, there may also be one or more additional clients 150a-b external to the illustrated portion of environment 100 capable of interacting with the environment 100 via the network 140. Further, the terms "client," "customer," and "user" may be used interchangeably as appropriate without departing from the scope of this disclosure. Moreover, while the client 150a-b is described in terms of being used by a single user, this disclosure contemplates that many users may use one computer, or that one user may use multiple computers. In general, clients may usually belong to one customer or company. Several employees of the customer, called users, can use the applications deployed on the corresponding client. For instance, the term "client" refers to a system providing a set of client applications belonging to or rented by a particular customer or business entity. Several employees of that particular customer or business entity can be users of that client and use the network applications provided by or available on this client.

The data stored in the local database 148 may be locked and accessed by the first backend server 102, and interacted with the front-end client 150a-b. In other instances, the data may be used by a network application 108 associated with one of the other backend servers 120 for processing applications associated with those systems. For example, one or more of the components illustrated within the backend servers 102, 120 may be located in multiple or different servers, cloud-based or cloud computing networks, or other locations accessible to the backend servers 102, 120 (e.g., either directly or indirectly via network 140). For example, each backend server 102, 120 and/or client 150a-b may be a Java 2 Platform, Enterprise Edition (J2EE)-compliant application server that includes technologies such as Enterprise JavaBeans® (EJB), J2EE Connector Architecture (JCA), Java Messaging Service (JMS), Java Naming and Directory Interface (JNDI), and Java Database Connectivity (JDBC). In some instances, each of the backend servers 102, 120 may store a plurality of various applications, while in other instances, the backend servers 102, 120 may be dedicated servers meant to store and execute certain network applications built based on the on-demand platform using the on-demand platform technology and on-demand platform business content. In some instances, the backend servers 102, 120 may include a web server or be communicably coupled with a web server, where one or more of the network applications 108 associated with the backend servers 102, 120 represent web-based (or web-accessible) applications accessed and executed through requests and interactions received on the front-end client 150a-b operable to interact with the programmed tasks or operations of the corresponding on-demand platform and/or network applications.

At a high level, the backend servers 102, 120 include an electronic computing device operable to receive, transmit, process, store, or manage data and information associated with the environment 100. The backend servers 102, 120 illustrated in FIG. 1 can be responsible for receiving requests from one or more clients 150a-b (as well as any other entity or system interacting with the backend servers 102, 120, including desktop or mobile client systems), responding to the received requests by processing said requests in an on-demand platform and/or an associated network application, and sending the appropriate responses from the appropriate component back to the requesting front-end client 150a-b or other requesting system. Components of the backend servers 102, 120 can also process and respond to local requests from a user locally accessing the backend servers 102, 120. Accordingly, in addition to requests from the front-end client 150a-b illustrated in FIG. 1, requests associated with a particular component may also be sent from internal users, external or third-party customers, and other associated network applications, business processes, as well as any other appropriate entities, individuals, systems, or computers. In some instances, either or both an on-demand platform and/or a network application may be web-based applications executing functionality associated with a networked or cloud-based business process.

As used in the present disclosure, the term "computer" is intended to encompass any suitable processing device. For example, although FIG. 1 illustrates three backend servers 102, 120, environment 100 can be implemented using any number of servers, as well as computers other than servers, including a server pool. Indeed, the backend servers 102, 120 and/or the clients 150a-b may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated backend servers 102, 120 may be adapted to execute any operating system, including Linux®, UNIX®, Windows®, Mac OS®, or any other suitable operating system.

The first backend server 102 is illustrated in details in FIG. 1. The first backend server 102 includes an interface 104, a processor 106, a memory 110, a network application 108, and other components further illustrated in FIG. 2. In some instances, the backend servers 102, 120 and its illustrated components may be separated into multiple components executing at different servers and/or systems. For example, while FIG. 1 illustrates the network application 108 and the processor 106 as separate components, other example implementations can include the processor 106 within a separate system, as well as within as part of the network application's inherent functionality. Thus, while illustrated as a single component in the example environment 100 of FIG. 1, alternative implementations may illustrate the backend servers 102, 120 as comprising multiple parts or portions accordingly.

In FIG. 1, the interface 104 is used by the first backend server 102 to communicate with other systems in a client-server or other distributed environment (including within environment 100) connected to the network 140 (e.g., one of the front-end clients 150a-b, as well as other clients or backend servers communicably coupled to the network 140). The term "interface" 104, 152 generally includes logic encoded software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100. Generally, the backend servers 102, 120 may be communicably coupled with a network 140 that facilitates wireless or wireline communications between the components of the environment 100 (e.g., among the backend servers 102, 120 and/or one or more front-end clients 150a-b), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the backend servers 102, 120 may be included within the network 140 as one or more cloud-based services or operations.

The term "network" refers to all or a portion of an enterprise or secured network, while in another instance, at least a portion of the network 140 may represent a connection to the Internet. In some instances, a portion of the network 140 may be a virtual private network (VPN). Further, all or a portion of the network 140 can include either a wireline or wireless link. Example wireless links may include 802.11a/b/g/n, 802.20, WiMax®, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Java Debug Wire Protocol (JDWP), Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the first backend server 102 includes a processor 106. Although illustrated as a single processor 106 in the backend server 102, two or more processors may be used in the backend server 102 according to particular needs, desires, or particular embodiments of environment 100. The backend servers 120 and 102, as well as other backend systems, may similarly include one or more processors. The term "processor" refers to a central processing unit (CPU), a blade, an application specific integrated circuit (ASIC), a field-programmable gate array (FPGA), or another suitable component. Generally, the processor 106 executes instructions and manipulates data to perform the operations of the backend server 102, and, specifically, the functionality associated with the corresponding network application 108. In one implementation, the server's processor 106 executes the functionality required to receive and respond to requests and instructions from the front-end client 150a-b, as well as the functionality required to perform the operations of the associated network application 108 and an on-demand platform, among others.

At a high level, the term "software application" and "networked application" described in this specification refer to any application, program, module, process, or other software that may execute, change, delete, generate, or otherwise manage information associated with the server 102, 120 or the client device 150a-b, and in some cases, a business process performing and executing business process-related events. In particular, business processes communicate with other users, applications, systems, and components to send, receive, and process events. In some instances, a particular network application 108 may operate in response to and in connection with one or more requests received from an associated client or other remote client. Additionally, a particular network application 108 may operate in response to and in connection with one or more requests received from other network applications external to the backend server 102. In some instances, the network application 108 can be a networked application, for example, the network application 108 is built on a common platform with one or more applications in either or both of the backend servers 120 and 102. In some instances, the network application 108 may request additional processing or information from an external system or application. In some instances, each network application 108 may represent a web-based application accessed and executed by the front-end client 150a-b via the network 140 (e.g., through the Internet, or via one or more cloud-based services associated with the network application 108).

Further, while illustrated as internal to the backend server 102, one or more processes associated with a particular network application 108 may be stored, referenced, or executed remotely. For example, a portion of a particular network application 108 may be a web service that is remotely called, while another portion of the network application 108 may be an interface object or agent bundled for processing at a remote system. Moreover, any or all of a particular network application 108 may be a child or sub-module of another software module or enterprise application (e.g., the backend servers 120 and 130). Still further, portions of the particular network application 108 may be executed or accessed by a user working directly at the backend servers 102, as well as remotely at corresponding front-end client 150a-b.

Regardless of the particular implementation, "software" may include computer-readable instructions (e.g., programming code), firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 106 executes the corresponding network application 108 stored on the associated backend servers 120. In some instances, a particular backend server may be associated with the execution of two or more network applications (and other related components), as well as one or more distributed applications executing across two or more servers executing the functionality associated with the backend servers.

FIG. 1 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 102. The data access does not require data replication and therefore can be stored at a single location (e.g., the memory 110). In addition, the memory 110 of the backend server 120 stores data and program instructions for the network application 108. The term "memory" refers to any memory or database module and may take the form of volatile or non-volatile memory including, without limitation, magnetic media, optical media, random access memory (RAM), read-only memory (ROM), removable media, or any other suitable local or remote memory component.

The memory 110 may store various business objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In an aspect, the term "business object" is a representation of an intelligible business or non-business entity, such as an account, an order, employee, an invoice or a financial report. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the network application 108 and/or other collaboration-related entities or components. Some or all of the elements illustrated within memory 110 may be stored external to the memory 110. These items may be made accessible within the network environment as illustrated in FIG. 2.

Figure 2:
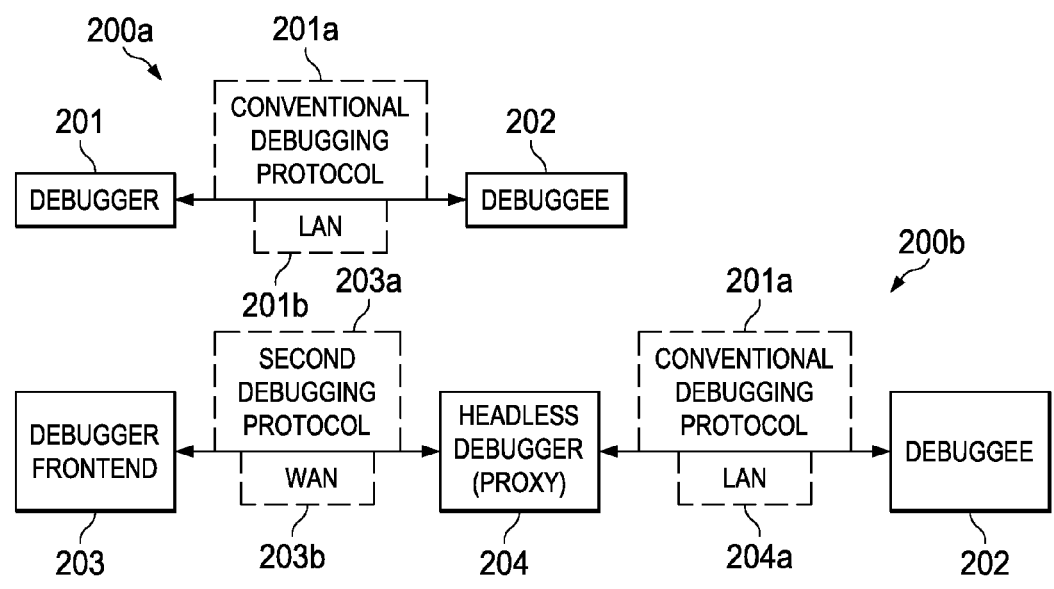
FIG. 2 illustrates example network environments for providing remote debugging to a software or cloud application.

FIG. 2 illustrates an exemplary network environment 200*a* for debugging a debuggee 202 (e.g., server 102, 120 of FIG. 1) by a debugger 201 (e.g., client 150*a-b* of FIG. 1), wherein the debugger and the debuggee are connected via a local area network connection 201*b* communicating the debugging data by using a conventional standardized debugging data protocol 201*a*. An example process of debugging works as follows: First, a developer connects the debugger to the running software application. This may be done while the application is running or the debugger starts the application itself. After that, the developer can use the debugger to break and resume the application execution and inspect the state of the application. Depending on the execution environment, it may be possible to change the state of the application through the debugging frontend or even change the application code to be executed. When the developer is finished the debugging frontend may disconnect from the application or just terminate it.

In Java, there is a standardized protocol 201*a* spoken between the debugger and debuggee. This is the so-called the Java Debug Wire Protocol (JDWP). Details of JDWP may be found at the corresponding specification: http://docs.oracle.com/javase/1.5.0/docs/guide/jpda/jdwp-spec.html.

JDWP is a binary, two-way communication protocol. The information transferred between the debuggee 202 and the debugger 201 may be encapsulated into well-defined binary data packets. JDWP is a request-response oriented protocol where both the debuggee and debugger are able to initiate communication requests. Typical examples for communication requests sent by the debugger may be: suspending/resuming threads, setting breakpoints and looking at variable content. The debuggee provides this kind of information via a corresponding response packet. Additionally, the debuggee is also able to initiate the communication. For example, if a breakpoint is hit in the debuggee VM, this information is sent from the debuggee to the debugger in an asynchronous manner. The advantage of having a well-defined, standardized debugging protocol which has to be implemented by every Java VM vendor may be that various debugger implementations (like the Eclipse debugger, jdb, NetBeans debugger, or the like) can debug arbitrary Java VMs coming from different vendors.

Figure 4A:
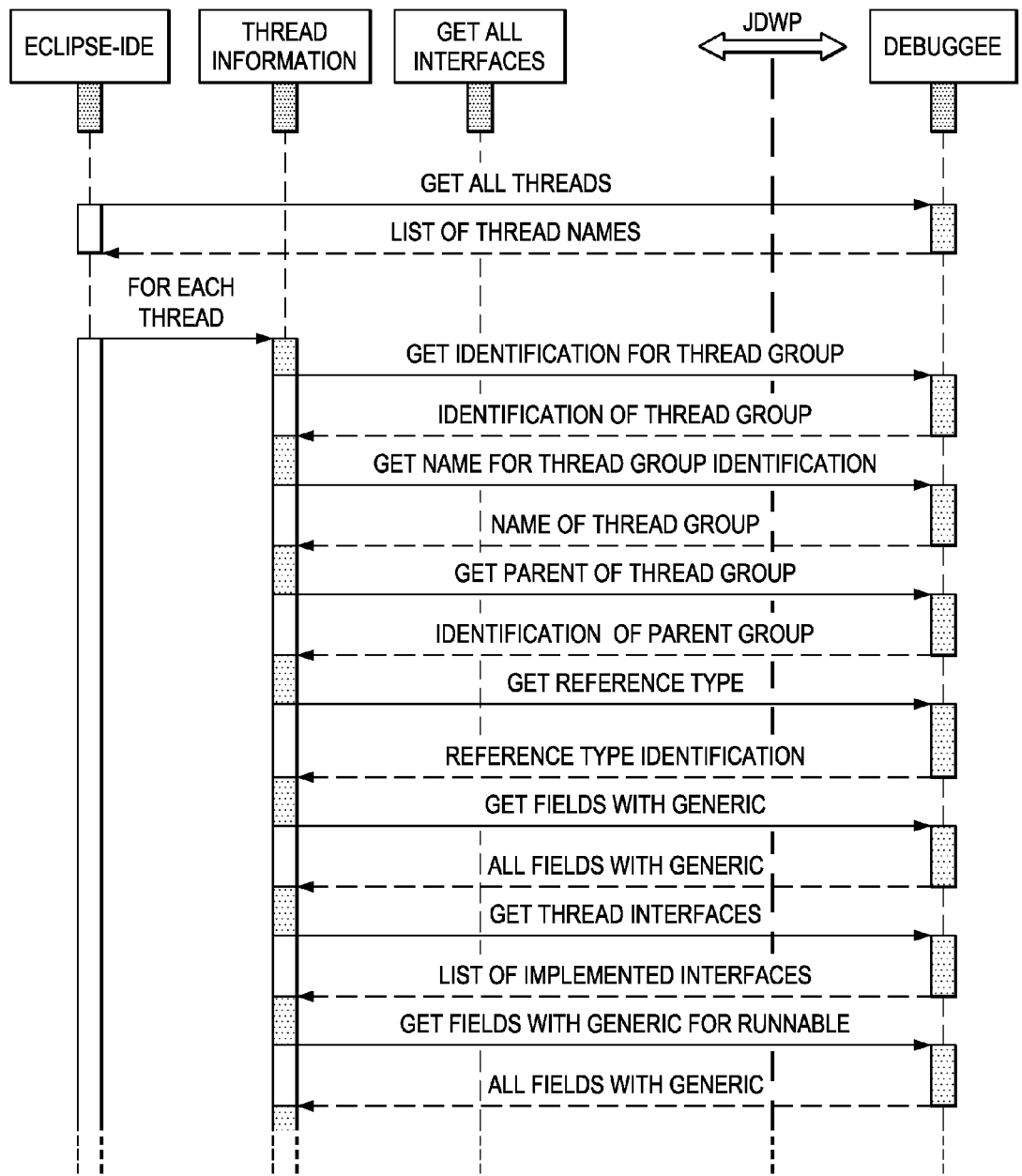
FIGS. 4A-4B describe exemplary thread messages which are exchanged between debugger and debuggee in case of JDWP as debugging data protocol.
Figure 4B:
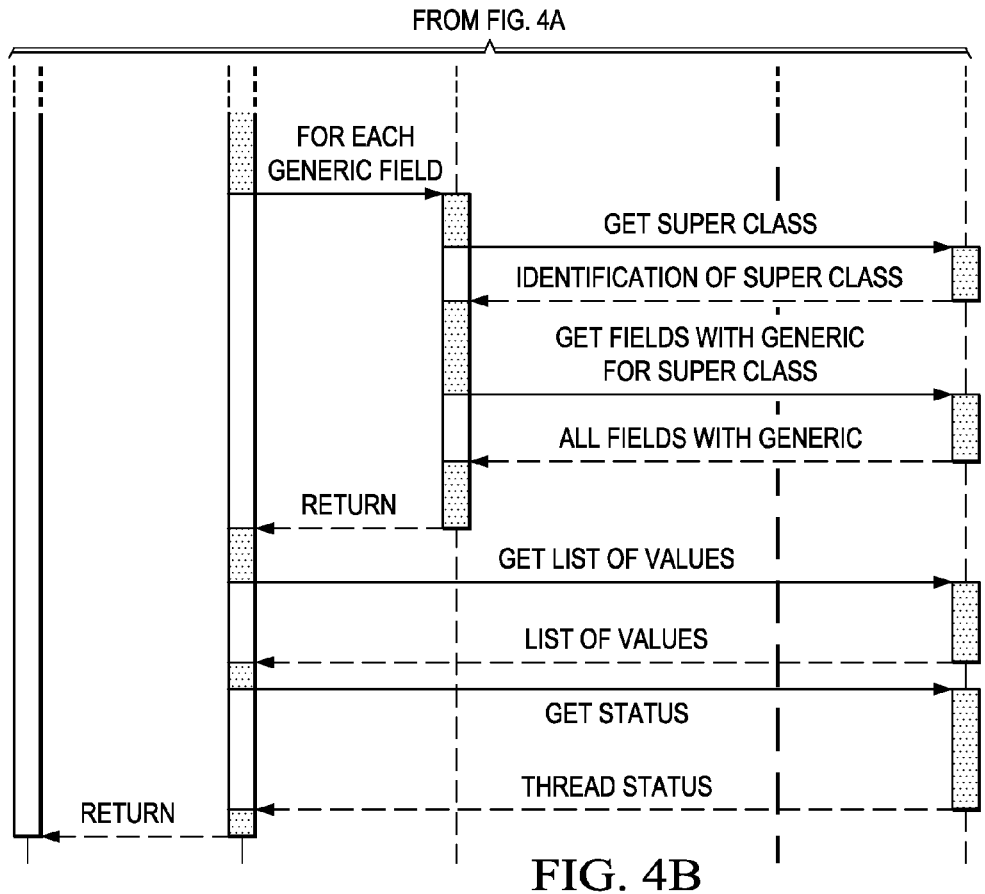

However, a developer may like to debug a Java software application running on a remote system, such as client 150*a-b* of FIG. 1 that is remote from the server 102, 120. That means the debuggee and the debugger are running on different hosts connected through a WAN connection (network 140). The standard debugging functionality within a normal Java VM (e.g. Oracle Hotspot Java VM) may allow a start to a Java VM with an open debugging port and to attach a local development integrated development environment (IDE) like Eclipse (including a Java debugger) to the Java VM. The standardized Java Debug Wire Protocol (JDWP) used for communication between the debugger and the debuggee may be rather chatty. A large number of messages are usually transferred between the debugger and the debuggee. The consequence is that debugging across a connection with a relatively high latency (e.g., how much time it takes to transfer one byte from one side to the other), such as a WAN or Internet, may be technically burdensome. In general, when a debugger (like the Eclipse debugger) attaches to this JVM, it initially requests the number of running threads. Then it requests a number of information per thread like the thread group the thread belongs to, the class of the thread and the instance fields of the individual threads. That means a number of independent messages/requests is created per individual thread. Before the thread lists gets displayed to the user, more than 1000 messages are routed between the debugger and the debuggee, e.g., if the application is running a significant number of threads (e.g. 50-500 threads). FIGS. 4A-4B illustrate an exemplary message flow between the debugger and the debuggee using JDWP. In case of a communication channel with a latency of 50-200 ms between the debuggee and the debugger, this may result in high pause times in the debugger. Debugging becomes impossible. The waiting times may thus be extremely high so that an interactive debugging session cannot be performed. For example, in case of 500 threads (typical value), 500 times 10=5000 thread messages may occur. In case of a typical latency time of 100 ms for a WAN connection one may have to overcome: 5.000 times 100 ms times 2 (round-trip)=1 million ms=17 minutes of waiting time for the developer. This may significantly decrease the efficiency of application development and debugging of the applications.

Figure 4C:
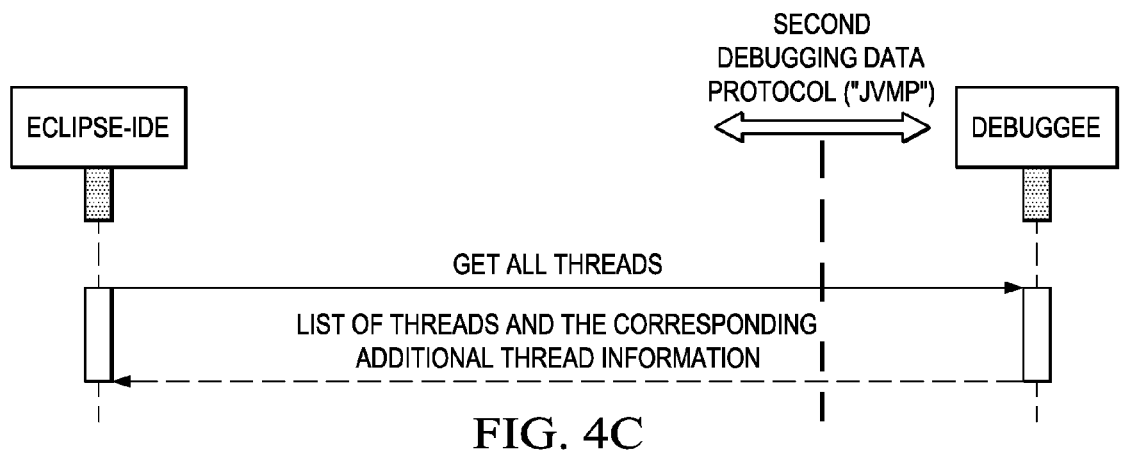
FIG. 4C describes an exemplary data packet of aggregated thread data which is exchanged between debugger and debuggee in case of a debugging data protocol according to the invention.

FIG. 2 further illustrates an exemplary network environment 200*b* for providing remote debugging across a wide area network 203*b* to a software application ("debuggee" 202) which is running on a server (e.g., server 102, 120 of FIG. 1) or in a cloud computing environment. The system described herein for providing the remote debugging of the software application across the wide area network connection may comprise: a remote communication device 203 ("debugger frontend") configured to transmit to the local computing device 202, instructions to switch a running software application to a debugging mode or to restart a software application in a debugging mode, wherein the remote communication device 203 (e.g., client 150*a-b* or server 102, 120 of FIG. 1) is communicatively connected to a local server ("headless debugger" or "proxy") 204 via a wide area network connection 203*b*; the local computing device 202 configured to transmit to the local server 204 (e.g., server 102, 120 of FIG. 1) thread data associated with the software application by using a first debugging data protocol 201*a* (e.g., JDWP if the debuggee 202 is running on a Java platform); the local server 204 configured to aggregate the received thread data and transmit the aggregated thread data in a data packet (e.g., as illustrated in FIG. 4C) to the remote communication device 203 by using a second debugging data protocol (e.g., a binary two-way communication protocol, or 1-step or 1-round-trip debugging data protocol, which is not JDWP); the remote communication device 203 configured to receive a debugging command (e.g., from the developer or the local computing device) and transmit the debugging command to the local server 204 by using the second debugging data protocol 203*a*; the local server 204 configured transmit to the local computing device 202 and by using the first debugging data protocol 201*a*, instructions to apply the debugging command to the software application running in the debugging mode; and wherein the first debugging data protocol 201*a* is different from the second debugging data protocol 203*a*.

In an aspect, the local server 204 is implemented within the local computing device 202 or wherein the local server is connected to the local computing device via a local area network connection 204a. In an aspect, the wide area network connection 203b has a latency time of more than 50 ms. In an aspect, the remote communication device 203 is a lightweight version of the debugger 201 in environment 200a, as the debugger frontend 203 in environment 200b may not perform the data processing of the thread data of the software application and may not operate the source code of the graphical user interface at the frontend debugger. The remote communication device 203 may be a display terminal configured to display the graphical user interface and to receive user interactions with the displayed graphical user interface, and wherein the display terminal includes a communication interface (e.g., interface 152) configured to receive and transmit data by using the second debugging data protocol 203a. In an aspect, the local server 204 provides the graphical user interface to the remote communication device 203 for display. In an aspect, the local server is configured to change the displayed graphical user interface based on the user interactions, and wherein the remote communication device 203 is configured to transform the user interactions to the debugging command.

In an aspect, the wide area network connection 203b is an Internet connection. In an aspect, the wide area network between the remote communication device and the local computing device is the same as the wide area network between the remote communication device and the local server. In an aspect, the local server 204 is a proxy server configured to forward data received from the remote communication device 203 by using the second debugging data protocol to the local computing device 202 by using the first debugging data protocol 201a. In an aspect, the local computing device is one of a mobile communication device, a desktop computer, and a cloud computing environment. In an aspect, the remote communication device includes an interface configured to receive and transmit data by using the second debugging data protocol. In an aspect, the local server 204 includes an interface (e.g., interface 104) configured to receive and transmit data by using the second debugging data protocol 203a, and wherein the local server further includes an interface (e.g., interface 104) configured to receive and transmit data by using the first debugging data protocol 201a. In an aspect, the local computing device includes an interface (e.g., interface 152) configured to receive and transmit data by using the first debugging data protocol 201a. In an aspect, the software application is implemented in an application execution environment on the local computing device.

In an aspect, the problem with regards to remote Java debugging may be the specification of the underlying debugging protocol JDWP. It may not be suitable for debugging remote Java applications across a connection with a relatively high latency between a debugger and a debuggee. In an aspect, a new protocol (e.g., called Java VM Protocol) may be defined between the debugger and the debuggee which is appropriate for WAN connections. The new, second debugging data protocol may avoid that a large number of messages (e.g., for one user interaction/request: less than 10 data packages, FIG. 4C, compared to 1000 pieces of thread data in case of JDWP, FIGS. 4A-4B) may be sent between the debugger frontend 203 and the debuggee 202 as a response to a user action on the debugger frontend 203. For example, when the user/debugger attaches to a debuggee, the user/debugger may want to get a list of all running threads together with some meta information about the corresponding threads (thread groups, the classes of the threads, instance fields of the threads, etc.). This information may be provided directly in one step to the debugger frontend 203 instead of having hundreds or more messages between the debugger 203 and the debuggee 202. Thus, it may be desirable to have exactly one roundtrip between the debugger and the debuggee in response to a user interaction on the debugger frontend.

A Java VM may implement the standard debugging protocol JDWP to be Java-compliant and the debugging infrastructure inside a JVM is rather complex, one architectural approach could be to implement the so-called headless debugger 204. This component gets placed between the debuggee 202 and the debugger 203. The headless debugger communicates via JDWP with the debuggee. The second debugging data protocol may be spoken between the debugger and the headless debugger. Via this approach no change in the actual Java Virtual Machine (the debuggee) implementation may be needed. This approach can be used to debug JVMs from arbitrary vendors without any change on the JVM/debuggee side. The debugger may be prepared to communicate with the headless debugger over the second debugging data protocol. Thus it may not be possible to use an arbitrary debugger like the Eclipse debugger or jdb to communicate with the headless debugger.

The Eclipse IDE provides a framework which may allow for integrating arbitrary debugging implementations into the IDE. In particular, one may plug-in a customized communication infrastructure. This functionality may be used for implementing the second debugging data protocol on the debugger side. The corresponding user interface parts like the Debug View, Breakpoints View etc. can completely remain untouched.

The headless debugger may be implemented as a Java library. It may act as a proxy between the debugger 203 and the debuggee 202. Requests from the debugger are handled and transferred into one or several JDWP requests. The JDWP responses may then be transferred into responses of the second debugging data protocol. The communication initiated by the debuggee may be handled analogously. The headless debugger may work like a debugger—but without a GUI part. It may provide a Java interface for getting debugging information (e.g., provide a list of all running Java threads, provide information about variable content, etc.) and executing commands (e.g., suspending/resuming threads, setting breakpoints, etc.). Additionally, the headless debugger may maintain the complete GUI state. For example, if a thread is selected on the debugger frontend or a specific GUI tree (e.g. variable content) gets opened, this information may be maintained in the headless debugger 204. Therefore, the communication between the debugger 203 and the headless debugger 204 looks as follows. When the user performs a GUI action, this action may be transferred to the headless debugger via the second debugging data protocol. In the headless debugger the corresponding GUI state gets updated. Then the updated GUI state gets transferred to the debugger and then the actual GUI gets updated. Via this implementation, the debugger GUI itself may remain simple and the transformation/incorporation to/of other debugger frontends (Swing UI, Web debugger, command line debugger, etc.) may be simplified.

FIG. 3 illustrates an exemplary method or process 300 for providing remote debugging across a wide area network to a software or cloud application ("debuggee") which is running either on a local device (e.g., client device 150a-b of FIG. 1) or in a cloud computing environment as debuggee device 303).

Remote communication device 301 ("debugger frontend") 301 may be connected with local or debugging server ("headless debugger") 302 and with debuggee device 303 via a wide area network connection. The headless debugger 302 may be connected with the debuggee device 303 via a local area network or cloud computing environment 305, or the headless debugger 302 may be implemented within the debuggee device 303 (e.g., in the same computing device).

At 306, the debugger frontend 301 receives a debugging request.

At 307, the debuggee device 303 receives from the debugger frontend a command to switch a running software or cloud application to a debugging mode or to restart a software or cloud application in a debugging mode.

At 308, the headless debugger 302 receives, from the debuggee device 303 and by using a first debugging data protocol, thread data associated with the software or cloud application.

At 309, the headless debugger aggregates the received thread data in a data packet of aggregated thread data (e.g., as illustrated in FIG. 4C), wherein the aggregated thread data is thread data that is related to the common application.

At 310, the debugger frontend 301 receives the data packet from the headless debugger 302, wherein the data packet was transmitted by using the second debugging data protocol.

At 311, the debugger frontend 301 receives a debugging command (e.g., from a user of the debugger frontend or from the debuggee device 303)

At 312, the headless debugger receives the debugging command from the debugger frontend, wherein the command was transmitted by using the second debugging data protocol.

At 313, the debuggee device 303 receives instructions from the headless debugger by using the first debugging data protocol, wherein the instructions were transmitted by using the first debugging data protocol, and wherein the instructions force the debuggee device 303 to apply the debugging command to the software application (e.g., to the programming code of the software application) running in the debugging mode.

At 314, the software application is switched back or restarted.

Turning back to FIGS. 4A-4B, and 4C, FIGS. 4A-4B describe exemplary thread messages (comprising thread data), which are exchanged between debugger and debuggee in case of JDWP as debugging data protocol. In an aspect, the thread data comprises at least one of a list of identified threads of the software application, name of thread group, list of thread interfaces, breakpoints in the programming code of the software application, error messages, type of undesired behavior of a user interface, categories associated with identified threads, thread stack traces, and variable content associated with stack frames. In an aspect, a number of dependent thread messages/requests is created per individual thread. For example, before the thread lists gets displayed to the user, more than 500 or more than 1000 thread messages may be routed between the debugger and the debuggee.

FIG. 4C describes an exemplary data packet of aggregated thread data, which is exchanged between debugger and debuggee in case of the second debugging data protocol described herein. In an aspect, the data packet comprises the thread data for FIGS. 4A-4B aggregated in one single data packet. In an aspect, only a single round-trip between the debuggee and the debugger may be required for a successful debugging of the software or cloud application (debuggee).

Figure 5:
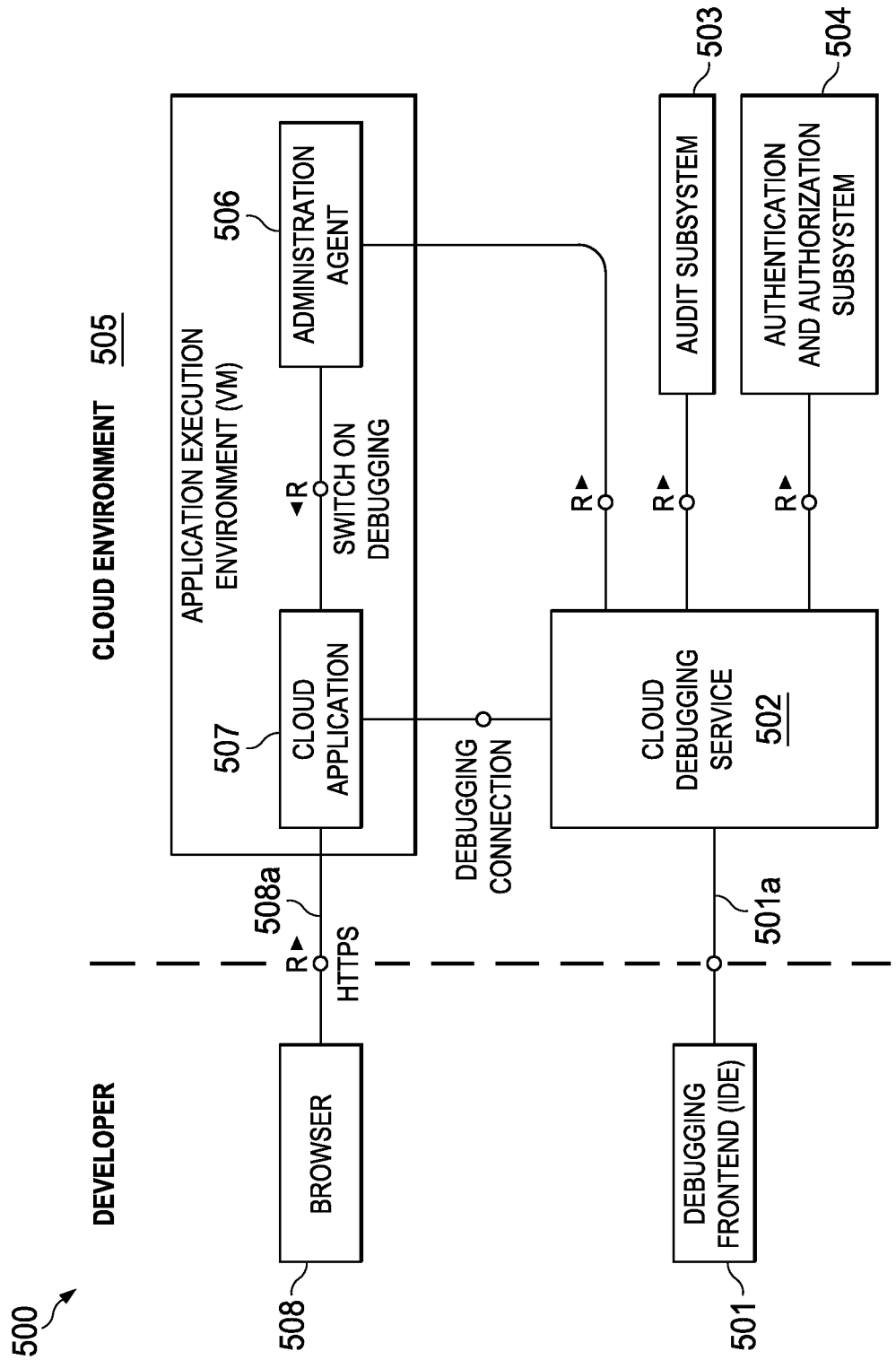
FIG. 5 illustrates an exemplary network environment for providing remote debugging across a wide area network to a cloud application which is running in a cloud computing environment.

FIG. 5 illustrates an exemplary network environment 500 for providing remote debugging of a cloud application 507 running in a cloud computing environment 505. As described herein, we assume cloud applications to be written in the Java programming language and running on a Java Virtual Machine (JVM), but the principles are not dependent on the type of programming language used. Furthermore, we assume cloud applications to be run in an virtualized environment where each application is run in its own virtual machine, but the principles may not be dependent on whether the applications run virtualized or not. Even though we assume in the following that each application has its own runtime environment, the principles may also apply if several applications share their runtime environment. In general, cloud computing environments may be used over an Internet connection 501a, 508a. This means that the latency may be much higher than in a local scenario. To support debugging cloud applications, it may also be necessary to use a coarse grained protocol (such as the above described second debugging data protocol) between the debugging frontend and the cloud computing environment. In addition to that, cloud debugging has even more demands than remote debugging. Due to the fact that cloud debugging uses the Internet as communication medium, it may have additional demands concerning security. The communication may have to be encrypted so that other entities participating on the Internet cannot sniff the potentially confidential data from the debugging connection. Furthermore, the user authentication and authorization may be useful to prevent a malicious person to debug an arbitrary cloud application thereby changing the application state.

In an aspect, the administration agent 506 may be able to switch the cloud application into debugging mode and vice versa (switch it back to normal operation mode). The administration agent 506 may be responsible for changes in the lifecycle of the cloud application 507, e.g. starting, stopping, changing the run mode, i.e. switching to debugging or run mode. The cloud connectivity client 603 and the cloud connectivity agent 609 may provide the illusion of a direct connection between components that can otherwise not communicate directly with each other. In an aspect, the cloud connectivity client/agent may be black boxes handling the communication details between the cloud application and debugger frontend (e.g., a service for tunneling arbitrary binary data between those two entities).

The network 500 that can provide a remote debugging of a cloud application 507 across a wide area network connection may generally comprise: a debugging device 502 (e.g., the debugging server including the headless debugger of FIGS. 2, 3) configured to transmit to the cloud application 507 implemented in a cloud computing environment 505, instructions to switch the running cloud application 507 to a debugging mode or to restart the cloud application 507 in a debugging mode (e.g., by the administration agent 506), wherein the debugging server 502 is implemented in the cloud computing environment 505; the cloud application 507 configured to transmit to the debugging server 502 thread data associated with the cloud application 507 by using a first debugging data protocol (e.g., JDWP); the debugging server 502 configured to aggregate the received thread data and transmit the aggregated thread data in a data packet to a remote communication device 501 (e.g., the debugger frontend of FIGS. 2, 3) by using a second debugging data protocol (e.g. Java VM Protocol of FIGS. 2, 4), wherein the remote communication device 501 is communicatively connected to the debugging server 502 via a wide area network connection 501a; the remote communication device 501 configured to receive a debugging command and transmit the debugging command to the debugging server 502 by using the second debugging data protocol; the debugging server 502 configured transmit to the cloud application 507 running in the debugging mode and by using the first debugging data protocol, instructions to apply the debugging command to the cloud application to be debugged 507; and wherein the first debugging data protocol is different from the second debugging data protocol. In an aspect, the wide area network connection has a latency time of more than 50 ms.

In an aspect, the cloud computing environment 505 is a Java virtual machine, wherein the first debugging data protocol is the Java Debug Wire Protocol, and wherein the second debugging data protocol is a binary two-way communication protocol. In an aspect, the VM like a VMWare/XEN image/environment, the cloud application and the administration agent 506 may run in separated Java VMs and those VMs may run in one VMWare/Xen environment. In an aspect, the remote communication device 501 is a display terminal configured to display a graphical user interface and to receive user interactions with the displayed graphical user interface, and wherein the display device includes a communication interface configured to receive and transmit data by using the second debugging data protocol, and wherein the debugging server provides the graphical user interface to the remote communication device for display, and wherein the debugging server 502 is configured to change the displayed graphical user interface based on the user interactions, and wherein the remote communication device is configured to transform the user interactions to the debugging command. In an aspect, the wide area network connection is an Internet connection 508a, and wherein the graphical user interface is a web browser 508.

Referring more specifically to FIG. 5, the entities on the left side of the figure (web browser 508 and debugging frontend 501) may usually run on the system of the developer. The dashed line between the left and the right side represents the separation between the components by a wide area network. The communication channels between the left and right side may utilize a number of networks, most notably the Internet. The right side includes the components useful for cloud debugging that run in the cloud computing environment. The following paragraphs describe the flow during cloud debugging.

In an aspect, when a developer (user at the debugger frontend 501) wants to debug a cloud application he/she uses a debugging frontend IDE to connect to the cloud computing environment 505. Since there may be several cloud applications 507 running in the cloud environment 505, the developer may have to provide some data identifying the cloud application to be debugged in addition to his/her user credentials. This data is then transmitted through a secure channel possibly employing the Internet to the cloud debugging service 502 (e.g., debugging server) running in the cloud computing environment. In an aspect, the debugging service 502 may optionally first check the authentication and authorization data provided by the developer using the corresponding cloud runtime subsystem 504.

In case the developer has passed the credential check and possesses the necessary permissions the request to debug an application is logged with the cloud audit subsystem 503. After that, the cloud debugging service either switches the corresponding cloud application into debug mode at runtime or it restarts the application in debug mode. For this purpose, the cloud debugging service may utilize the administration agent 506 running in the same application execution environment as the application to be debugged (debuggee) 507. In an aspect, when the cloud application 507 is running in debug mode, the cloud debugging service 502 establishes a connection to the cloud application 507 to be debugged. Then, the cloud debugging service 502 may either relay the thread data of the debugging connection to the debugging frontend 501 or it might even provide the debugging frontend with sufficient thread data so that the debugging frontend may directly communicate with the debugged cloud application (debuggee) 507. After that, the debugging connection may be established and the developer may begin to debug the cloud application, e.g. by triggering it using the browser 508.

In case any of the above debugging operations fails, the cloud debugging service 502 triggers corresponding actions to reset the cloud application 507. Most notably, that means that the error condition is logged in the audit subsystem 503. Furthermore, the cloud application 507 may be switched back to ordinary run mode, either directly at runtime or by restarting it. There may be additional steps necessary depending on the cloud environment.

In an aspect, when the developer is finished with the debugging session, the shutdown may be triggered similarly to the connection setup originating from the debugging frontend 501. It notifies the cloud debugging service 502 of the request. On the cloud side, the cloud debugging service 502 uses the audit subsystem 503 to mark the end of the debugging session and resets the cloud application 507 in a similar way as the error case.

In an aspect, additionally (or alternatively) to the manually triggered session shutdown, the cloud debugging service 502 may also impose automatic shutdown of a debugging session in case some thresholds are met. For example, if a debugging session is idle for a certain amount of time, the cloud debugging service may decide to automatically switch the cloud application back into run mode. This is especially useful in case a developer forgets to disconnect from a debugging session causing cloud runtime resources to be unnecessarily occupied. Furthermore, a cloud debugging service 502 may choose to end a debugging session in case the connection to the debugging frontend 501 is lost or the debugging frontend has not retrieved data for the session for a certain amount of time. The reasons for this are similar to an 'idle' case, e.g., to free up cloud runtime resources that are used only for debugging sessions that may be dead already.

In an aspect, the communication between the debugging frontend and the cloud infrastructure may pass several untrusted networks such as the internet. Therefore, it may be necessary to encrypt the data. Depending on the networks involved, it may not be possible to run an arbitrary protocol between the debugging frontend and the cloud. Unfortunately, some networks only allow a few common protocols to pass, e.g. http. Due to this fact, it might be necessary to run the cloud debugging protocol piggybacked on another protocol.

There are two basic variants how the debugging frontend 501 may communicate with the debugged cloud application 507 once the debugging connection is established. The debugging frontend may either use the cloud debugging service 502 as relay station (see FIG. 5) or it may use a direct connection using a tunnel (see FIG. 6). It may depend on the scenario which solution fits best.

The first solution in FIG. 5 has the communication (e.g., all) running through the cloud debugging service. This may impose scalability issues if several applications are debugged in parallel. Furthermore, this makes the cloud debugging service a single point of failure that may prevent cloud debugging when the service goes down. Since all communication is relayed in this solution, it is easy to log 'special' operations, such as code replacement or value changes, using the cloud audit subsystem. In addition to that, it is easy to implement global rules concerning connection management and automatic connection shutdown (as described in the previous section). This is due to the fact that everything runs through the cloud debugging service which allows for direct reaction to the relayed data.

Figure 6:
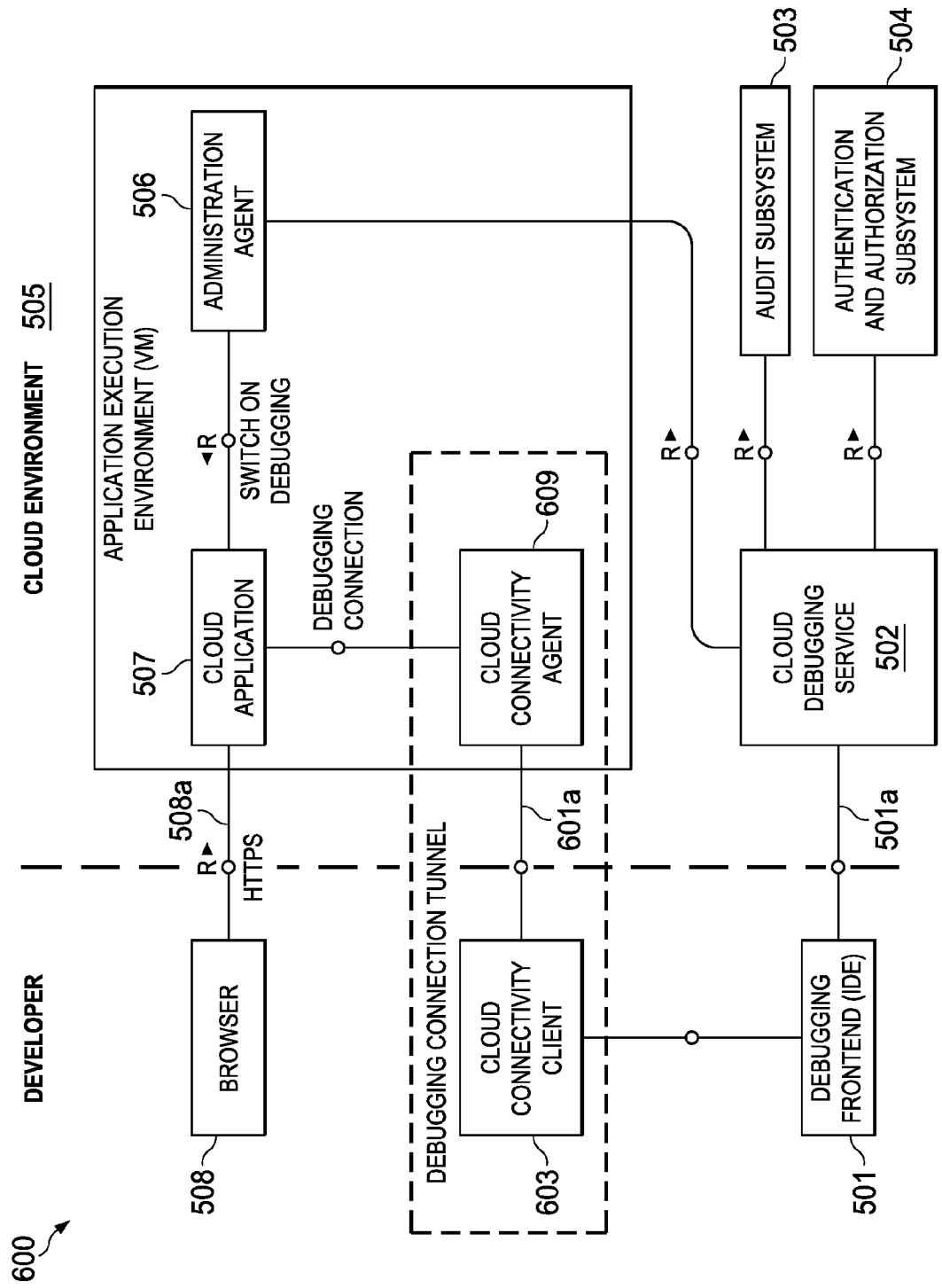
FIG. 6 illustrates remote debugging of a cloud application across a wide area network by using a connection tunnel.

FIG. 6 illustrates an exemplary network environment 600 for providing a remote debugging of a cloud application 507 across a wide area network. The second solution illustrated in FIG. 6 utilizes the cloud debugging service 502 for establishing the debugging connection and tearing it down when it is no longer needed. During connection setup, the cloud debugging service 502 does not directly connect to the cloud application to be debugged. Instead 502 provides the debugging frontend 501 with information necessary to setup a debugging connection tunnel 601a. This tunnel has a component that is local to the debugging frontend 501 and a component that is local to the cloud application 507 to be debugged. All data that is input at the one end of the connection is tunneled through the connection 601a to the other end and the other way round.

An advantage of this solution may be that it resolves the scalability issues of the first solution by moving the resources needed per connection to the cloud application execution environment. The cloud application execution environment is an entity rented by the application provider from the cloud provider. Therefore, the second solution may make billing of cloud debugging sessions and the necessary resources easier because most of the needed resources are already accounted for in the application execution environment. However, this second solution makes a few things more difficult that in the first solution. For example, it is harder to log debugging operations to the audit subsystem 503 since the debugging connection tunnel 601a acts as a pure tunnel without changing the data or reacting to it. Furthermore, implementing global policies concerning debugging session shutdown may be much harder to implement because the actual connections are spread across potentially several cloud application execution environments.

Figure 7:
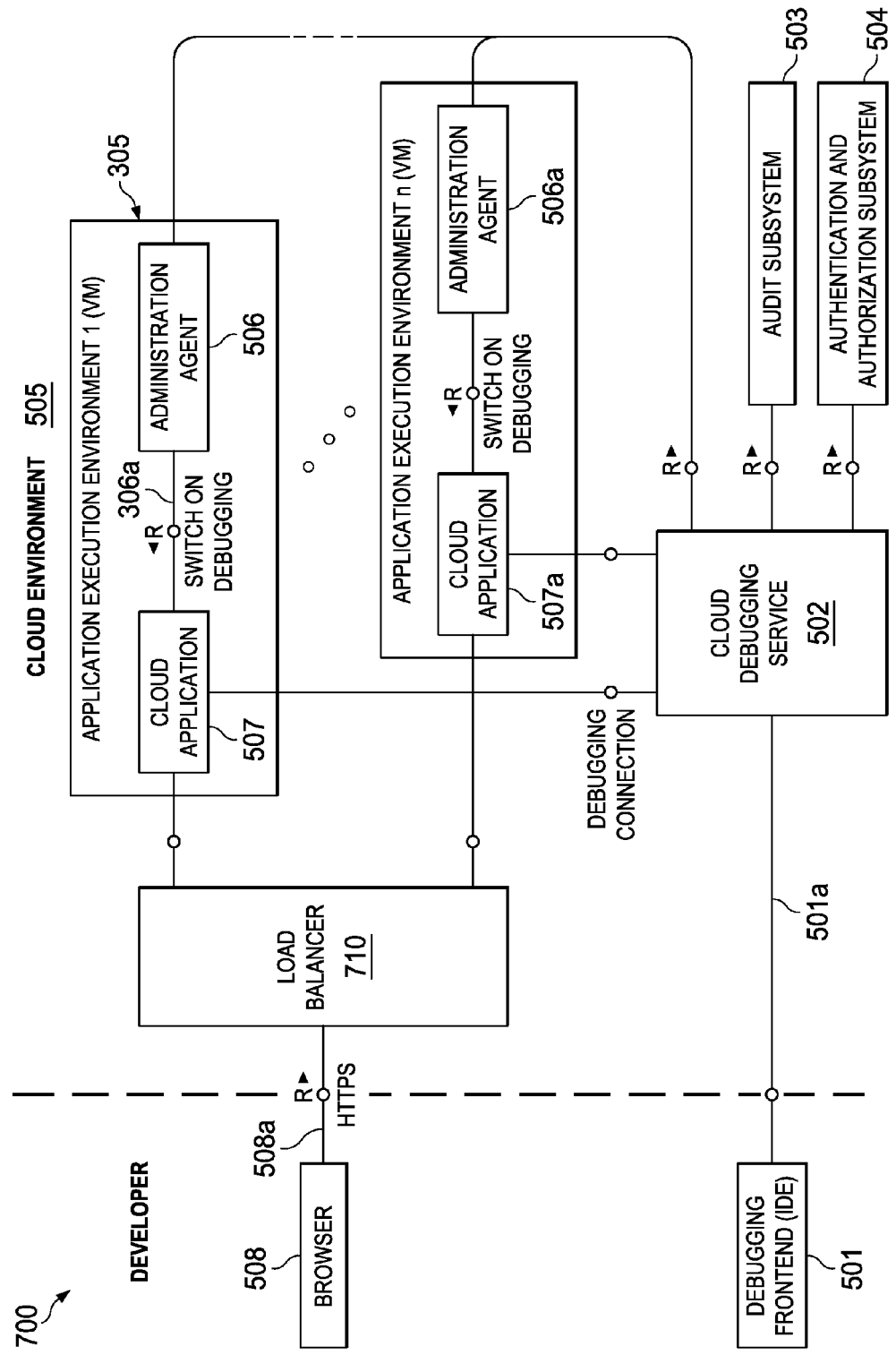
FIG. 7 illustrates the network environment of FIG. 5 scaled up to multiple cloud application nodes.

FIG. 7 illustrates an exemplary network environment 700 for providing a remote debugging of a cloud application 507, 507a across a wide area network. The scalability of cloud applications is usually achieved by adding several cloud application nodes. The general cloud architecture, as shown in FIG. 7, adds a load balancer 710 (e.g., a computing device implemented in the cloud computing environment) as the entry point for all requests to cloud applications. The load balancer can choose any application node for a request, but usually sessions stick to one node, e.g., once a client has established a connection to a cloud application node, following requests will go to the same application node. In a scenario like this, adding more application nodes enables the cloud application to handle more user requests thereby scaling it.

Figure 8:
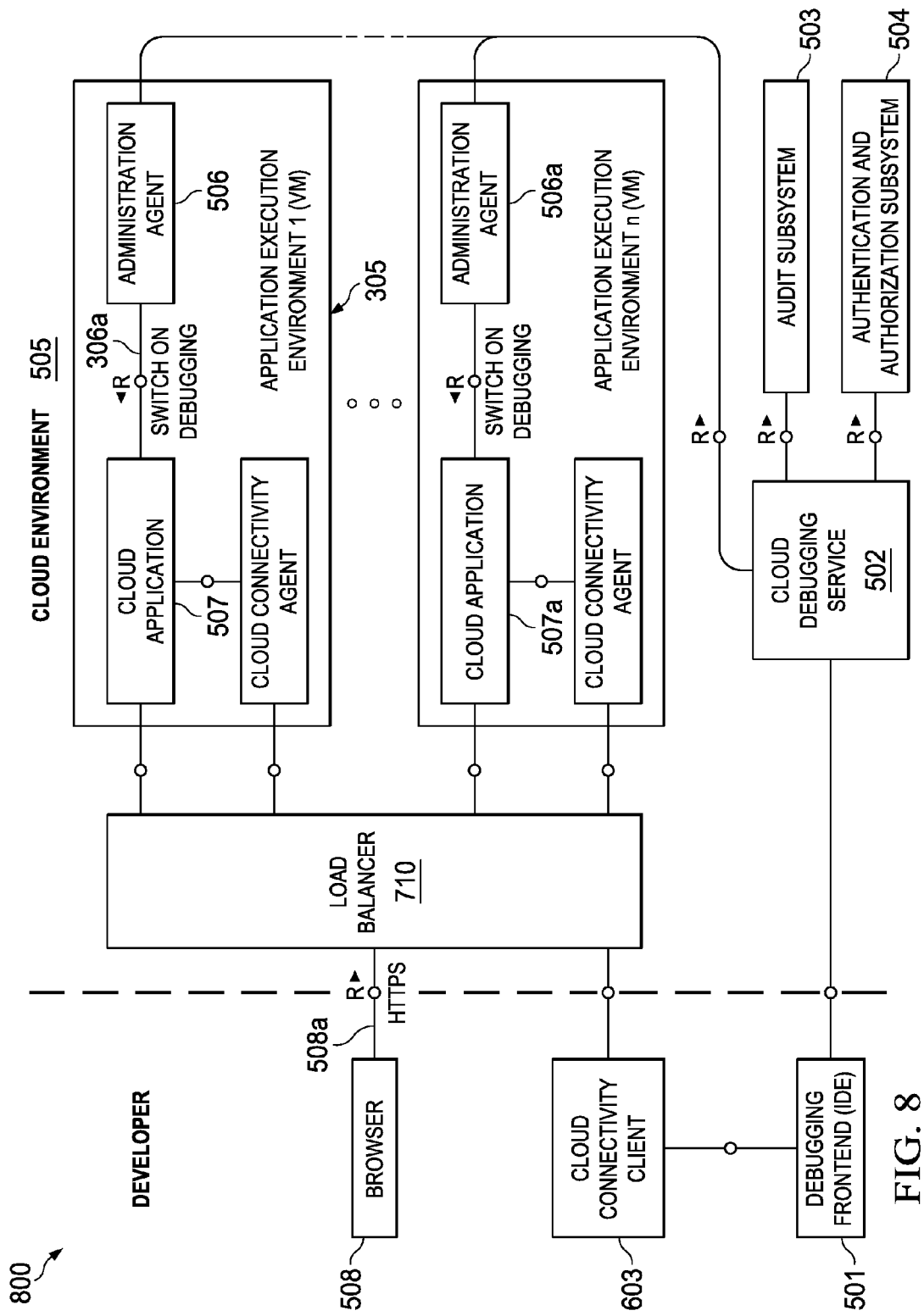
FIG. 8 illustrates the network environment of FIG. 6 scaled up to multiple cloud application nodes.

For debugging such a cloud application scenario with multiple nodes, several approaches are possible. One approach could be to switch all application nodes into debug mode and use the cloud debugging service 502 not only as relay station, but also for aggregating the thread data from the application nodes. This is also possible with the tunnel approach introduced in FIG. 6. However, then the aggregation of the debugging data has to be done on the debugging frontend side. In addition to that, in that scenario several tunnels are necessary, one for each cloud application node. Such a scenario is illustrated in FIG. 8. FIG. 8 illustrates the network environment of FIG. 6 scaled up to multiple cloud application nodes in an expanded network 800.

It is not always desired to debug all cloud application nodes at the same time, because, for example, it would enable simple denial of service attacks by triggering breakpoints in all cloud application nodes. Therefore, it may be useful to debug only one of the cloud application nodes. This can be done as previously described in this document. However, additional actions may be necessary so that the developer can actually trigger the cloud application 507, 507a node being debugged. To achieve this, the corresponding cloud application node may be removed from the ordinary routing pool of the cloud application in the load balancer 710 so that ordinary requests are no longer forwarded to the node being debugged. In addition to that, a new special entry point has to be registered with the load balancer 710 so that requests to this address can be routed to the node being debugged. The new entry point address may be sent to the developer so that he/she may use it to trigger the corresponding application actions in the cloud application node being debugged.

In an aspect, another approach to detect which application instance may be debugged is to define a set of rules relevant for putting an instance to debug mode. Only the first application instance fulfilling those rules gets debugged. A rule could be reaching a special code location (break point), but it could also describe a specific state of the VM the application is running on (e.g. when available memory less than 5 percent put it in debug mode). After the end of the debugging session, the special routing may be cleaned up again and the cloud application node may be returned to the ordinary routing pool of the cloud application 507, 507a.

The preceding figures and accompanying description illustrate example processes and computer implementable techniques. But network environment 100, 200a-b, 500, 600, 700, 800 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, each network environment may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art.

What is claimed is:

1. A computer-implemented method for receiving a remote debugging of a software application across a wide area network connection, the method comprising:

receiving, at a local server from a local computing device, thread data associated with all running and corresponding threads of a software application executable by the local computing device, the thread data received in response to instructions to adjust the software application to a debugging mode, the thread data transmitted via a first debugging data protocol;

aggregating, at the local server, the received thread data;

performing a single communication roundtrip between the local server and a remote communication device in response to the received instructions to adjust the software application to the debugging mod, the single communication roundtrip including:

i) transmitting the aggregated thread data in a single data packet to the remote communication device connected to the local server via a wide area network connection by using a second debugging data protocol that is different than the first debugging data protocol, the second debugging data protocol including a one-round-trip debugging data protocol that indicates that the single communication roundtrip performed between the local server and the remote communication device includes only one communication roundtrip between the local server and the remote communication device, ii) receiving, at the local server and from the remote communication device, a debugging command based on the single data packet, the debugging command transmitted via the second debugging data protocol; and transmitting, from the local server to the local computing device by using the first debugging data protocol, instructions to apply the debugging command to the software application running in the debugging mode and adjust the software application to a running operation mode.

2. The method of claim 1, wherein the debugging command includes at least one of changing the programming code of the software application; suspending of a thread associated with the thread data, resuming a thread associated with the thread data, setting a breakpoint, retrieving a list of threads associated with the thread data, identifying a thread category of a thread associated with the thread data, retrieving thread stack traces, obtaining variable content of certain stack frames, obtaining structural information about symbols, or getting expression evaluation results.

3. The method of claim 1, further comprising:
upon the adjusting of a running software application to a debugging mode, initiating a local area network communication session between the local server and the software application running in the debugging mode.

4. The method of claim 1, further comprising:
identifying, at the local server, the corresponding threads by their relationship with the running threads.

5. The method of claim 4, wherein the relationship between the corresponding threads and the running threads comprises at least one of common programming code of the software application, same thread of the software application, or including identical breakpoint in programming code.

6. A computer-implemented method for transmitting a remote debugging of a software application across a wide area network connection, the method comprising:
transmitting, from a remote communication device to a local computing device, instructions to adjust a running software application to a debugging mode, the remote communication device communicatively connected to a local server via a wide area network connection;
performing a single communication roundtrip between the local server and the remote communication device in response to the received instructions to adjust the software application to the debugging mode, the single communication roundtrip including:
i) receiving, at the remote communication device from the local server, aggregated thread data in a single data packet by using a second debugging data protocol, the thread data associated with all running and corresponding threads of the software application on the local computing device, and the thread data aggregated at the local server after the thread data was transmitted from the local computing device to the local server by using a first debugging data protocol that is different than the second debugging protocol, the second debugging data protocol including a one-round-trip debugging data protocol that indicates that the single communication roundtrip performed between the local server and the remote communication device includes only one communication roundtrip between the local server and the remote communication device;

ii) transmitting, by the remote communication device to the local server, a debugging command based on the single data packet, the debugging command transmitted via the second debugging data protocol; and instructing the local server to transmit to the local computing device, by using the first debugging data protocol, instructions to apply the debugging command to the software application running in the debugging mode and instructions to adjust the software application to a running operation mode.

7. The method of claim 6, further comprising:
receiving, at the remote communication device, a debugging request from the local computing device or from a user of the remote communication device, wherein the debugging request includes an identifier identifying the software application on the local computing device.

8. The method of claim 6, wherein the thread data comprises at least one of a list of identified threads of the software application, breakpoints in the programming code of the software application, error messages, type of undesired behavior of a user interface, categories associated with identified threads, thread stack traces, or variable content associated with stack frames.

9. The method of claim 6, wherein the debugging command includes at least one of changing the programming code of the software application; suspending of a thread associated with the thread data, resuming a thread associated with the thread data, setting a breakpoint, retrieving a list of threads associated with the thread data, identifying a thread category of a thread associated with the thread data, retrieving thread stack traces, obtaining variable content of certain stack frames, obtaining structural information about symbols, or getting expression evaluation results.

10. The method of claim 9, wherein the debugging command further comprises instructions to switch the software application from the debugging mode to the running operation mode in which the software application is configured to process input received from a user at the local computing device, or wherein the debugging command further comprises instructions to restart the software application in the running operation mode in which the software application is configured to process input received from a user at the local computing device.

11. A computer program product encoded on a non-transitory, tangible storage medium, the product comprising computer readable instructions for causing one or more computers to perform operations for receiving a remote debugging of a software application across a wide area network connection, the operations comprising:
receiving, at a local server from a local computing device, thread data associated with all running and corresponding threads of a software application executable by the local computing device, the thread data received in response to instructions to adjust the software application to a debugging mode, the thread data transmitted via a first debugging data protocol;
aggregating, at the local server, the received thread data;
performing a single communication roundtrip between the local server and a remote communication device in response to the received instructions to adjust the software application to the debugging mod, the single communication roundtrip including:
i) transmitting the aggregated thread data in a single data packet to the remote communication device connected to the local server via a wide area network connection by using a second debugging data protocol that is different than the first debugging data protocol, the second debugging data protocol including a one-round-trip debugging data protocol that indicates that the single communication roundtrip performed between the local server and the remote communication device includes only one communication roundtrip between the local server and the remote communication device, ii) receiving, at the local server and from the remote communication device, a debugging command based on the single data packet, the debugging command transmitted via the second debugging data protocol; and transmitting, from the local server to the local computing device by using the first debugging data protocol, instructions to apply the debugging command to the software application running in the debugging mode and adjust the software application to a running operation mode.

12. The computer program product of claim 11, wherein the debugging command includes at least one of changing the programming code of the software application; suspending of a thread associated with the thread data, resuming a thread associated with the thread data, setting a breakpoint, retrieving a list of threads associated with the thread data, identifying a thread category of a thread associated with the thread data, retrieving thread stack traces, obtaining variable content of certain stack frames, obtaining structural information about symbols, or getting expression evaluation results.

13. The computer program product of claim 11, the operations further comprising:
upon the adjusting of a running software application to a debugging mode, initiating a local area network communication session between the local server and the local computing device.

14. The computer program product of claim 11, the operations further comprising:
identifying, at the local server, the corresponding threads by their relationship with the running threads.

15. The computer program product of claim 14, wherein the relationship between the corresponding threads and the running threads comprises at least one of common programming code of the software application, same thread of the software application, or including identical breakpoint in programming code.

16. A computer program product encoded on a non-transitory, tangible storage medium, the product comprising computer readable instructions for causing one or more computers to perform operations for transmitting a remote debugging of a software application across a wide area network connection, the operations comprising:
transmitting, from a remote communication device to a local computing device, instructions to adjust a running software application to a debugging mode, wherein the remote communication device is communicatively connected to a local server via a wide area network connection;
performing a single communication roundtrip between the local server and the remote communication device in response to the received instructions to adjust the software application to the debugging mode, the single communication roundtrip including:
i) receiving, at the remote communication device from the local server, aggregated thread data in single a data packet by using a second debugging data protocol, wherein the thread data is associated with all running and corresponding threads of the software application on the local computing device, and wherein the thread data was aggregated at the local server after the thread data was transmitted from the local computing device to the local server by using a first debugging data protocol, the second debugging data protocol including a one-round-trip debugging data protocol that indicates that the single communication roundtrip performed between the local server and the remote communication device includes only one communication roundtrip between the local server and the remote communication device;

ii) transmitting, by the remote communication device to the local server, a debugging command based on the single data packet, the debugging command transmitted via the second debugging data protocol; and instructing the local server to transmit to the local computing device, by using the first debugging data protocol, instructions to apply the debugging command to the software application running in the debugging mode and instructions to adjust the software application to a running operation mode, wherein the first debugging data protocol is different from the second debugging data protocol.

17. The computer program product of claim 16, the operations further comprising:
receiving, at the remote communication device, a debugging request from the local computing device or from a user of the remote communication device, wherein the debugging request includes an identifier identifying the software application on the local computing device.

18. The computer program product of claim 16, wherein the debugging command includes at least one of changing the programming code of the software application; suspending of a thread associated with the thread data, resuming a thread associated with the thread data, setting a breakpoint, retrieving a list of threads associated with the thread data, identifying a thread category of a thread associated with the thread data, retrieving thread stack traces, obtaining variable content of certain stack frames, obtaining structural information about symbols, and getting expression evaluation results.

19. The computer program product of claim 16, wherein the thread data comprises at least one of a list of identified threads of the software application, breakpoints in the programming code of the software application, error messages, type of undesired behavior of a user interface, categories associated with identified threads, thread stack traces, and variable content associated with stack frames.

20. The computer program product of claim 18, wherein the debugging command further comprises instructions to switch the software application from the debugging mode to the running operation mode in which the software application is configured to process input received from a user at the local computing device, or wherein the debugging command further comprises instructions to restart the software application in the running operation mode in which the software application is configured to process input received from a user at the local computing device.

21. A system for providing a remote debugging of a software application across a wide area network connection, the system comprising:
a remote communication device configured to transmit to a local computing device, instructions to adjust a running software application to a debugging mode, wherein the remote communication device is communicatively connected to a local server via a wide area network connection;

the local computing device configured to transmit to the local server thread data associated with all running and corresponding threads of the software application by using a first debugging data protocol;

the local server configured to aggregate the received thread data;

the local server and the remote communication device configured to perform a single communication roundtrip between the local server and the remote communication device in response to the received instructions to adjust the software application to the debugging mode, the single communication roundtrip including:

i) the local server configured to transmit the aggregated thread data in a single data packet to the remote communication device by using a second debugging data protocol that is different than the first debugging data protocol, the second debugging data protocol including a one-round-trip debugging data protocol that indicates that the a single communication roundtrip performed between the local server and the remote communication device includes only one communication roundtrip between the local server and the remote communication device in response to the received instructions, ii) the remote communication device configured to transmit the debugging command based on the single data packet to the local server by using the second debugging data protocol; and the local server configured to transmit to the local computing device and by using the first debugging data protocol, instructions to apply the debugging command to the software application running in the debugging mode and instructions to adjust the software application to a running operation mode.

22. The system of claim 21, wherein the local server is implemented within the local computing device or wherein the local server is connected to the local computing device via a local area network connection.

23. The system of claim 21, wherein the wide area network connection has a latency time of more than 50 ms.

24. The system of claim 21, wherein the local computing device is a Java virtual machine, and wherein the first debugging data protocol is the Java Debug Wire Protocol.

25. The system of claim 21, wherein the remote communication device is a display terminal configured to display a graphical user interface and to receive user interactions with the displayed graphical user interface, and wherein the display device includes a communication interface configured to receive and transmit data by using the second debugging data protocol, and wherein the local server provides the graphical user interface to the remote communication device for display, and wherein the local server is configured to change the displayed graphical user interface based on the user interactions, and wherein the remote communication device is configured to transform the user interactions to the debugging command.

* * * * *